Aug. 7, 1945.  P. L. CRITTENDEN  2,381,211
ELECTRIC DECELEROMETER
Filed June 27, 1942   2 Sheets-Sheet 1

INVENTOR
Philip L. Crittenden
BY
ATTORNEY

Aug. 7, 1945.    P. L. CRITTENDEN    2,381,211
ELECTRIC DECELEROMETER
Filed June 27, 1942    2 Sheets-Sheet 2

INVENTOR
Philip L. Crittenden
BY

ATTORNEY

Patented Aug. 7, 1945

2,381,211

UNITED STATES PATENT OFFICE 2,381,211

ELECTRIC DECELEROMETER

Philip L. Crittenden, Edgewood, Pa., assignor to The Westinghouse Air Brake Company, Wilmerding, Pa., a corporation of Pennsylvania Application June 27, 1942, Serial No. 448,809

11 Claims. (Cl. 175—355)

This invention relates to electric decelerometers and has particular relation to electric decelerometers particularly suited for direct application to the axle of a railway car wheel.

Electric decelerometers for registering or recording the rate of change of speed of a rotary element, either while accelerating or decelerating, have been previously proposed. Such electric decelerometers are principally of the generator or the commutator types employing brushes or contacts of various kinds which are subject to wear, thus requiring servicing and repair.

It is an object of my present invention to provide an electric decelerometer of novel construction and mode of operation which does not require any commutators, collector rings or brushes and which is therefore capable of longer service without servicing or repair than heretofore known devices.

It is another object of my invention to provide an electric decelerometer device which is particularly suited for direct application to the axle of a railway car wheel in that it is so constructed and arranged as to withstand the constant and severe shock and vibration to which the axle is subjected in service.

Figure 1:
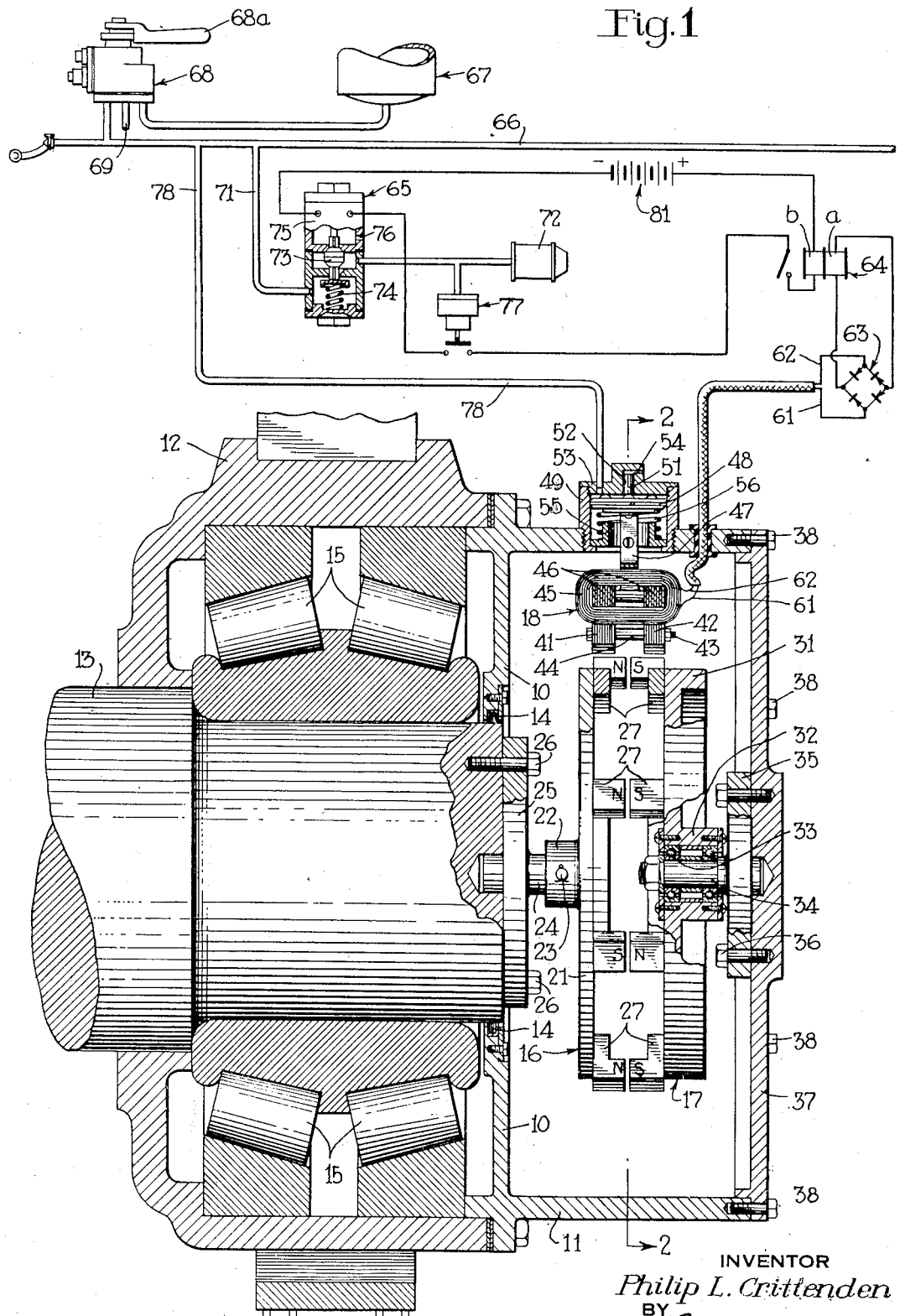
Figure 2:
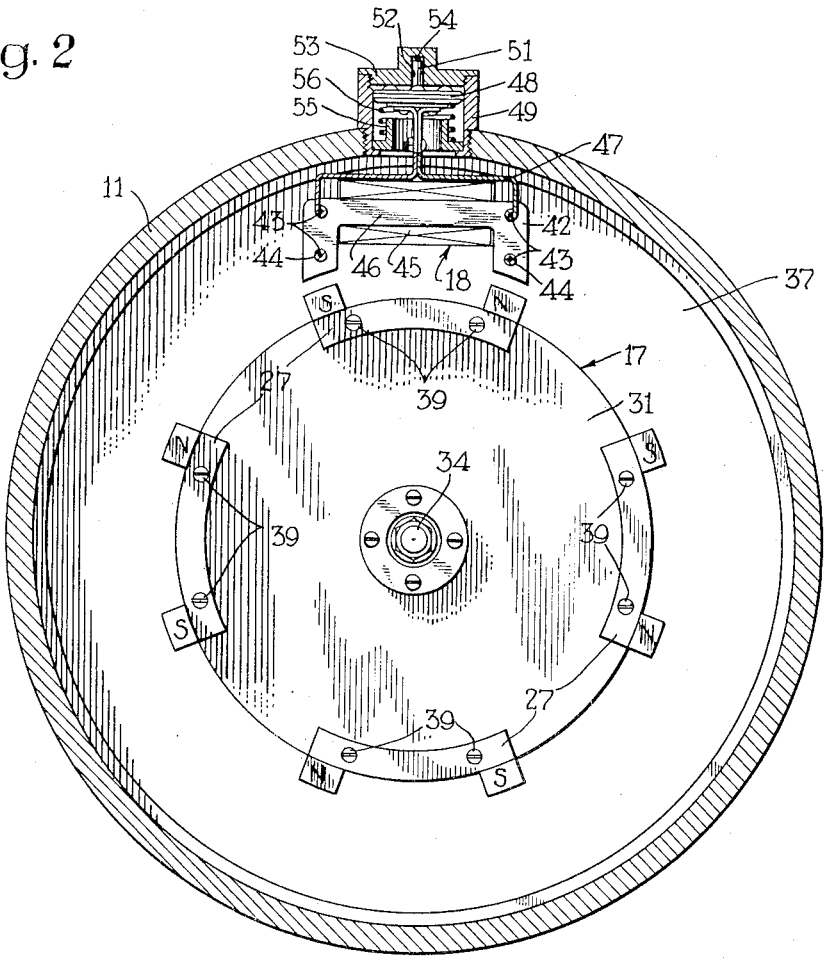
Figure 2:

The above objects and other objects of my invention which will be made apparent hereinafter are attained by means of apparatus subsequent to be described and shown in the accompanying drawings wherein Fig. 1 is a composite view, partly in section and partly diagrammatic, showing my invention illustratively employed in connection with a railway car wheel axle and arranged to control the brakes associated with the wheels of the car, and Fig. 2 is a sectional view taken on the line 2—2 of Fig. 1 showing further details of construction.

Description of equipment

While my electric deceleromotor is applicable to any rotary element for the purpose of registering the rate of change of rotational speed thereof, it is shown illustratively in connection with a railway car wheel axle for the purpose of controlling the brakes associated with the car wheels.

Referring to Fig. 1 of the drawings, my electric decelerometer is arranged to be supported within a tubular casing 11 that is secured to the outer end of the journal casing 12 for a car wheel axle 13, in place of the usual end cover. The inner end of the casing 11 has an annular flange 10 extending radially inwardly with a suitable central opening therein in which an oil retainer ring 14 of suitable type is secured for engaging the periphery of the axle 13 adjacent its outer end. The oil within the journal casing 12 for lubricating the tapered roller bearings 15 supporting the axle 13 in the journal casing 12 is thus prevented from traveling along the axle into the chamber formed within the tubular casing 11.

Essentially, my electric decelerometer comprises a rotary element 16, a rotary inertia element 17, and an electromagnet member 18.

The rotary member 16 comprises a disk 21 of relatively light-weight non-magnetic material, such as brass, aluminum, or alloys thereof, the disk having a central hub 22 which is secured as by a pin 23 to a spindle 24. Spindle 24 has a circular securing flange 25 that is attached, as by a plurality of screws 26, to the end of the axle 13 in such a manner that the spindle and disk rotate in coaxial relation thereto.

A plurality of permanent magnets 27 of shallow U-shape are suitably secured as by screws, not shown, to the outer face of the disk 21 adjacent the periphery thereof and in uniformly spaced angular relation. Any suitable number of permanent magnets 27 may be provided, four being shown for purposes of illustration.

The opposite poles or pole-pieces of the permanent magnets are marked N and S, respectively, indicative of North and South polarity, respectively. The permanent magnets 27 are secured to the disk 21 in such a manner that successive pole-pieces of the permanent magnets, circumferentially of the disk, are of opposite polarity.

The rotary inertia member 17 comprises a flywheel 31 of suitable non-magnetic material such as brass, the flywheel having a hub 32 which is journaled, as by ball bearings 33, on a spindle 34 attached by a securing flange 35 and suitable screws 36 to the inner face of an end cover 37. End cover 37 is, in turn, secured as by screws 38 to the outer open end of the tubular casing 11.

It is important to note that the fly-wheel 31 is of relatively heavy mass compared to the disk 21 of the first rotary member 16, which is of relatively light-weight construction.

A plurality of permanent magnets 27, corresponding in number to the number of permanent magnets 27 secured to the disk 21, are secured in corresponding angular spaced relation adjacent the periphery of the fly-wheel 21, as by screws 39. (See Fig. 2)

The pole-pieces of the permanent magnets 27 on the fly-wheel 31 extend axially into relatively close clearance relation to the pole-pieces of the permanent magnets 27 on the disk 21, the pole-pieces of opposite polarity on the disk 21 and flywheel 31 being normally in axial alignment whereby the fly-wheel 31 and the disk 21 are normally held for rotation together by the magnetic attraction between the pole-pieces of unlike polarity.

The electromagnet member 18 comprises two magnetically insulated axially spaced magnetic core elements 41 and 42, of substantially U-shape, secured together as by a plurality of bolts 43 of non-magnetic material and separated by sleeve spacers 44 of non-magnetic material.

A rectangular winding 45 is supported on and surrounds the base portion 46 of the magnetic core elements 41 and 42 between the pole-pieces formed at the opposite ends of the magnetic core elements. The pole-pieces of the magnetic core elements 41 and 42 extend radially inward toward the permanent magnets 27 on the disk 21 and flywheel 31, the magnetic core element 41 being in radial alignment with the pole-pieces of the permanent magnets 27 on the disk 21 and the pole-pieces of the magnetic core element 42 being a radial alignment with the pole-pieces of the permanent magnets 27 attached to the fly-wheel 31.

The magnetic core elements 41 and 42 are supported by a suitable bracket member 47, of non-magnetic material, which is attached to a piston 48 of relatively small diameter that operates in a small sleeve or cylinder 49 screwed radially into a suitably threaded hole provided in the wall of the tubular casing 11. The piston 48 has a stem 51 that is guided in a suitable bore 52 provided in a screw cap 53 closing the outer end of the cylinder 49. A suitable breather port 54 connecting the bore 52 to atmosphere is provided for preventing dash-pot action of the piston.

The cylinder 49 has a shoulder formed at the lower end thereof on which rests a collar 55 that is slidably movable within the cylinder. The shank of bracket 47 extends through the central opening in the collar 55. Interposed between the collar 55 and the lower face of the piston 48 is a coil spring 56 which normally urges the piston to its outer position, as shown, whereby the magnetic core elements 41 and 42 are raised upwardly to a corresponding outer position removed from the permanent magnets 27, for a reason hereinafter explained.

Fluid under pressure is supplied to the chamber within the cylinder 49 above the piston 48, by means subsequently to be described, to force the piston radially inward against the force of the spring 56 to an inner position, determined by the engagement of the lower face of the piston with an annular rib formed on collar 55 in surrounding relation to the central opening in the collar. In this inner position of the piston 48, the ends of the pole-pieces of the magnetic core elements 41 and 41 are in close proximity to the pole-pieces of the permanent magnets 27 as they rotate therepast with rotation of the members 16 and 17.

The winding 45 of the electromagnet member 18 is connected by two wires 61 and 62 to the input terminals of a full-wave rectifier 63, indicated as of the dry-disk or copper-oxide type.

Associated with the rectifier 63 is an electrical relay 64 having a pick-up winding a and a holding winding b. The pick-up winding a of the relay 64 is connected across the output terminals of the rectifier 63.

While the relay 64 may be provided for any desired control purpose, it is illustrated as controlling a brake release magnet valve device 65.

As diagrammatically shown in simplified form, the fluid pressure brake control equipment, of which the magnet valve device 65 is a part, comprises a control pipe 66, a reservoir 67, and a brake valve device 68. Brake valve 68 is of the self-lapping type described in detail and claimed in Patent No. 2,042,112 of Ewing K. Lynn and Rankin J. Bush. Briefly, the brake valve 68 has an operating handle 68a which is shiftable from a normal brake release position in a horizontal plane into an application zone. In the brake release position, of the operating handle 68a, the brake valve 68 is conditioned to cause fluid under pressure to be exhausted from the control pipe 66 to atmosphere through an exhaust port and pipe 69 at the brake valve. When the brake valve handle 68a is shifted into its application zone, the brake valve 68 operates to cause fluid under pressure to be supplied from the reservoir 67 to the pipe 66. The valve mechanism of the brake valve 68 is such as to lap the supply of fluid under pressure to the pipe 66 automatically at pressures corresponding to the degree of displacement of the brake valve handle 68a out of its brake release position, thereby causing the pressure in the control pipe 66 to vary in accordance with the degree of displacement of the brake valve handle out of its brake release position.

If for some reason, such as leakage, the pressure in the pipe 66 tends to reduce, the valve mechanism of the brake valve 68 operates automatically to supply fluid under pressure to maintain a pressure in the pipe corresponding to the position of the brake valve handle. This pressure-maintaining feature of the brake valve 68 will be referred to hereinafter in connection with an assumed operation.

The magnet valve 65 is interposed in a branch pipe 71 connecting the control pipe 66 to one or more brake cylinders 72, only one of which is shown. The magnet valve 65 is of conventional type having a double-beat valve 73 that is urged to an upper seated position by a spring 74 and actuated to a lower seated position in response to energization of a magnet winding 75 of the magnet valve device. In its upper seated position, the valve 73 establishes communication through the branch pipe 71 whereby fluid under pressure in the control pipe 66 may flow to the brake cylinder 72 to establish a corresponding pressure therein effective to cause application of the brakes to a corresponding degree.

In its lower seated position, the valve 73 cuts off the communication through the branch pipe 71 and establishes a venting communication whereby fluid under pressure is rapidly exhausted from the brake cylinder 72 to atmosphere through an exhaust port 76.

A pressure responsive switch 77 is connected into the pipe 71 at a point adjacent the brake cylinder 72 and is responsive to variations of pressure in the brake cylinder to opposite sides of a critical pressure. The switch 77 may be of any suitable snap-acting type adapted to close its contacts whenever the pressure in the brake cylinder 72 exceeds a certain low pressure, such as five pounds per square inch, and to maintain them closed as long as such brake cylinder pressure is maintained. Moreover, the character of the switch 77 is such that when the pressure in the brake cylinder 72 reduces below five pounds per square inch, the contacts of the switch are restored to their open position. The function of the switch 77 will be made apparent hereinafter.

Fluid under pressure is supplied to the pressure chamber above the actuating piston 48 of the electromagnet member 18 by means of a branch pipe 78 of the control pipe 66. The strength of the spring 55 holding the piston 48 in its raised position is such that when the pressure in the control pipe 66 exceeds a low pressure, such as five pounds per square inch, the spring 55 is overcome and the electromagnet member 18 shifted from its outer into its inner position. Conversely, when the pressure in the pipe 66 reduces below five pounds per square inch, the spring 55 restores the piston and consequently the electromagnet member 18 to its outer position.

*Operation*

Let it be assumed that the car having the axle 13 is traveling under power and that the operator desires to bring the car to a stop. To do so, he first shuts off the propulsion power in the usual manner and then shifts the brake valve handle 68a out of its brake release position into the application zone an amount corresponding to the desired degree of brake application. The control pipe 66 is accordingly charged to a pressure corresponding to the position of the brake valve handle in the application zone, for example, fifty pounds per square inch, and being connected thereto through the magnet valve 65, the brake cylinder 72 is likewise charged with fluid at the same pressure to cause application of the brakes to a corresponding degree.

The pressure established in the brake cylinder 72 is effective to cause closure of the pressure switch 77 since the pressure of five pounds per square inch requisite for closing of the switch is exceeded. The closing of the switch 77 is however without immediate consequences.

At the time the application of the brakes is initiated, fluid under pressure supplied through the pipe 78 to the upper face of the piston 48 causes the electromagnet member 18 to be shifted into its inner position.

It should be understood that prior to application of the brakes on the axle 13 the two rotary members 16 and 17 are locked together magnetically by the magnetic attraction of the permanent magnets 27 on the two members for each other. When the brakes are applied on axle 13, the fly-wheel 31 tends to overrun the member 16 due to its momentum or inertia effect. However, as long the the rate of rotative deceleration of the axle 13 does not exceed a certain rate, corresponding to a normal or non-slipping rate of rotative deceleration of the car wheels fixed on axle 13, the magnetic attraction of the permanent magnets 27 on the members 16 and 17 is sufficiently strong to maintain the fly-wheel 31 in locked relation to the member 16 and thus to the axle 13.

As is well known, a car wheel or axle of the rotating type shown may rotatively decelerate at a rate corresponding to a rate of retardation of four or five miles per hour per second of the car without slipping of the wheels occurring. Whenever the wheels begin to slip, however, due to the degree of brake application exceeding the limit of the coefficient of adhesion between the wheels and the rails or road surface, the wheels and axle decelerate rotatively at an abnormally rapid rate greatly in excess of that corresponding to four or five miles per hour per second retardation of the car. Accordingly, the rotative deceleration of the wheel axle 13 at a rate exceeding ten miles per hour per second is a positive indication of the slipping condition of the wheels fixed on the axle 13.

As previously stated, however, as long as the axle 13 rotatively decelerates at a non-slipping rate, that is, a rate less than ten miles per hour per second, the fly-wheel 31 and the axle 13 remain magnetically locked together and therefore rotate at the same speed.

The rotation of the pole-pieces of the permanent magnets 27 on the rotary member 16 past the cooperating pole-pieces of the magnetic core element 41 causes alternate increase and decrease of the flux density in the core element and an alternating current voltage is thus induced in the winding 45, which voltage corresponds in frequency and in effective value to the rotational speed of the axle 13.

The rotation of the permanent magnets 27 on the fly-wheel 31 past the pole-pieces of the magnetic core element 42 causes alternate increase and decrease of the flux density in the core element thereby inducing an alternating current voltage in winding 45 having a frequency and an effective value corresponding to the speed of rotation of the fly-wheel 31.

It will be apparent, however, that due to the reversed relation of the pole-pieces of the permanent magnets 27 on the disk 16 and member 17, the voltages induced in the winding 45 in response to the rotation of the respective members 16 and 17 are in opposing relation. Moreover, as long as the two members 16 and 17 rotate at the same speed, such voltages are not only opposing but of substantially the same instantaneous value.

It will thus be seen that as long as the axle 13 rotatively decelerates at a non-slipping rate, substantially no current is induced or flows in the winding 45 due to the balanced relation of the voltages induced therein.

If, however, upon an application of the brakes, the wheels fixed to the axle 13 begin to slip so that the rate of rotative deceleration of the axle exceeds ten miles per hour per second, a further operation occurs which will now be described. Due to the excessive rate of rotative deceleration of the axle 13 when the wheels begin to slip, the momentum of the inertia member 17 is sufficient to overcome the magnetic attraction of the permanent magnets on the members 16 and 17, thereby causing those members to become unlocked magnetically, that is out of step. In such case, therefore, the inertia member 17 continues to rotate at a much higher speed than the speed of rotation of the axle 13, notwithstanding the fact that the magnetic attraction of the permanent magnets on members 16 and 17 for each other does to some extent exert a braking effect on the inertia member 17.

When the inertia member 17 overruns the member 16, therefore, the balanced relation of the voltages induced in the winding 45 of the electromagnet member 18 is destroyed. In such instance, the frequency of the two voltages induced in the winding 45 differs substantially in proportion to the instantaneous speed of rotation of the members 16 and 17 and the effective value of the induced alternating current voltages likewise varies in proportion to the actual speed of rotation of the members 16 and 17.

It follows, therefore, that an alternating current is induced in the winding 45 due to the difference in frequency and instantaneous value of the voltages induced therein. This alternating current induced in the magnet winding 45 is effective, as rectified into direct-current by the rectifier 63, to energize the pick-up winding *a* of the relay 64 to cause actuation of the single front contact of the relay 64 to its picked-up or closed position.

The contact of the relay 64 is effective in its picked-up position to establish a circuit for energizing the magnet winding 75 of the brake release magnet valve device 65. This circuit may extend from the plus terminal of a suitable source of direct-current, such as a storage battery 81, through a series circuit including the holding winding b of the relay 64, contact of the relay 64, the contacts of the pressure switch 77 now closed, the winding 75 of the magnet valve 65, and back to the negative terminal of the battery 81.

Energization of the holding winding b of the relay 64 is effective to maintain the contact of the relay in its picked-up or closed position independently of variations of current in the pick-up winding a due to subsequent variation in the rotative condition of the axle 13.

It will thus be seen that when the wheels fixed on the axle 13 begin to slip, the relay 64 is picked-up and maintained picked-up until the pressure switch 77 opens in response to the reduction of the pressure in the brake cylinder 72 caused by the operation of the magnet valve device 65.

It will be apparent that upon operation of the magnet valve 65, fluid under pressure is rapidly released from the brake cylinder 72 to cause a reduction in the degree of application of the brakes associated with the slipping wheels. At the same time, the pressure acting on the pressure switch 77 is correspondingly reduced.

Due to the reduction of the pressure in the brake cylinder 72, the slipping wheels promptly cease to decelerate and accelerate at an abnormally rapid rate back toward a speed corresponding to car speed. Such variation in the rotative condition of the axle 13 has no effect on the relay 64 which remains picked-up due to the self-holding circuit established thereby.

As the axle 13 approaches vehicle speed to a close degree, the disparity of the speed of the disk member 16 with respect to the fly-wheel member 17 becomes insufficient to overcome the magnetic attraction of the permanent magnets 27 on the members 16 and 17 respectively, and the two members thereby again become magnetically locked in step and rotate together.

The time required for the pressure in the brake cylinder 72 to reduce sufficiently, that is below five pounds per square inch, to cause opening of the pressure switch 77 is longer ordinarily than the time required for the slipping wheels to be restored to the vehicle or car speed.

Thus, in the ordinary manner of operation, the slipping wheels will be restored to car speed before the pressure switch 77 opens in response to the reduction of brake cylinder pressure by operation of the magnet valve device 65.

When the pressure switch 77 opens, it interrupts the self-holding circuit for the holding winding b of the relay 64 and also deenergizes the winding 75 of the magnet valve device 65.

In view of the fact that the pick-up winding a of the relay 64 is at this time substantially deenergized due to the fact that the axle 13 and inertia member 17 are again synchronized, the deenergization of the holding winding b of the relay 64 causes the contact of the relay to be restored to its dropped-out or open position.

The magnet valve device 65 is operated in response to deenergization of the magnet winding 75 thereof to cut off the exhaust communication for the brake cylinder 72 and reestablish the supply communication through the branch pipe 71 from the control pipe 66 to the brake cylinder. The brake cylinder is accordingly recharged with fluid at a pressure corresponding to the pressure remaining established in the control pipe 66 and the brakes are thus reapplied to a corresponding degree.

Due to the supply of fluid under pressure to the brake cylinder 72 as just described, the pressure in the control pipe 66 may tend to reduce. However, due to the pressure-maintaining feature of the brake valve 68, the pressure in the control pipe 66 is maintained in accordance with the position of the brake valve handle 68a notwithstanding the supply of fluid under pressure to the brake cylinder 72.

In the event that the wheels fixed on the axle 13 again begin to slip upon reapplication of the brakes in the manner just described, the electric decelerometer apparatus again functions in the manner previously described to effect a reduction of the pressure in the brake cylinder 72 and a subsequent resupply of fluid under pressure thereto, such operation occurring repeatedly as long as any slipping of the wheels occurs in resopnse to reapplication of the brakes.

When the car comes to a stop, the magnet valve device 65 is always restored to its normal position because of the interruption of the self-holding circuit including the winding b of the relay 64 in the manner previously described. Accordingly, the operator may vary the degree of pressure in the brake cylinder 72 as desired while the car is stopped to hold the car aaginst creepage on any grade encountered in service.

When the operator again desires to start the car, he first releases the brakes by shifting the brake valve handle 68a to its brake release position, thereby exhausting the fluid under pressure in the control pipe 66 and the connected brake cylinder 72 to atmosphere through the exhaust port and pipe 69 at the brake valve. The brakes are accordingly released in response to the reduction of the pressure in the brake cylinder 72 to atmospheric pressure.

Pressure switch 77 is thus opened in response to the reduction of the pressure in the brake cylinder 72 to below five pounds per square inch, thereby preventing energization of the winding 75 of the magnet valve 65 during operation of the car under power while the brakes are released.

Upon the reduction of the pressure in the control pipe 66 to atmospheric pressure, spring 56 shifts the piston 48 and the electromagnet member 18 supported thereby to its outer position. In the outer position of the electromagnet member 18, the clearance between the pole-pieces of the magnetic core elements 41 and 42 and the pole-pieces of the permanent magnets 27 on the members 16 and 17 is increased sufficiently to prevent the undesired locking of the inertia member 17 against rotation with the axle 13 when the axle again begins to rotate. It will be apparent that the air-gap between the pole-pieces of opposite polarity of the permanent magnets 27 on the members 16 and 17 is relatively small compared to the air-gap between the pole-pieces of the permanent magnets and the pole-pieces of the magnetic core elements 41 and 42 when the latter are moved to their outer position. Accordingly, it will be seen that the major portion of the magnetic flux lines emanating from and returning to the pole-pieces of the permanent magnets 27 flows through two aligned permanent magnets 27 on members 16 and 17 and that the leakage flux through the magnetic core elements 41 and 42 in the outer position thereof does not subtract materially from the total flux of the permanent magnets 27. Accordingly, the magnetic attraction of the permanent magnets 27 on the members 16 and 17, respectively for each is sufficiently great to insure the magnetically locked relation of the members 16 and 17 when the axle 13 begins to rotate.

It might be possible to support the electromagnet member 18 in a fixed position with respect to the pole-pieces of the permanent magnets 27 without providing means, such as the piston 48, for adjusting the position thereof. However, it would then be necessary to accurately proportion the air-gap between the pole-pieces of permanent magnets 27 on the members 16 and 17 to the air-gap between the permanent magnets and the magnetic core elements 41 and 42 so that the undesired locking of the fly-wheel member 17 in a stationary position by the attraction of the magnetic core element 42 for the permanent magnets 27 on the member 17 would not occur.

It is thus preferable to employ means, such as the piston 48, for adjusting the position of the electromagnet member 18 relative to the pole-pieces of the permanent magnets 27 to avoid the necessity for accurate proportioning of the air-gaps in the manner above-mentioned.

While I have described the operation of my decelerometer to detect a predetermined rate of rotative deceleration of a rotary element, it will be apparent that it is effective to detect a predetermined rate of rotative acceleration of a rotary element notwithstanding the fact that such inherent function thereof has not been utilized in the particular brake control equipment shown and described herein. My invention, as defined in the appended claims, is accordingly not limited to the detection of deceleration but comprehends the detections of acceleration as well.

Having now described my invention, what I claim as new and desire to secure by Letters Patent is:

1. Apparatus for detecting the rate of change of speed of a rotary element, said apparatus comprising a rotary member driven at all times according to the speed of the rotary element, a rotary inertia member, permanent magnet means on said rotary member, permanent magnet means on said rotary inertia member, said two permanent magnet means moving in a circular path and being closely juxtaposed so as to exert mutual magnetic attraction to cause said rotary inertia member to rotate at the same speed as the rotary member as long as the rotary element does not change speed at a rate exceeding a certain rate and being ineffective to prevent rotation of the rotary inertia member at a speed different from that of the rotary member when the rotary element changes speed at a rate exceeding said certain rate, a winding positioned closely adjacent the said circular path of the permanent magnet means on the rotary member and the permanent magnet means on the rotary inertia member so that alternating voltages are induced therein upon rotation of said rotary member and rotary inertia member, said voltages being proportional in frequency and effective value to the rotational speed of the rotary member and the rotary inertia member respectively, the voltage induced in the winding by rotation of the rotary member being in opposition to the voltage induced in response to rotation of the rotary inertia member whereby the several voltages induced in the winding are substantially equal and opposite as long as the rotary member and rotary inertia member rotate at the same speed and unbalanced in degree and differing in frequency when the rotary member and rotary inertia member rotate at different speeds, and means operatively responsive to the current flowing in said winding caused by the unbalance of voltages induced therein.

2. Apparatus for detecting the rate of change of speed of a rotary element, said apparatus comprising a rotary member driven at all times in accordance with the rotational speed of the rotary element, a rotary inertia member mounted for rotation coaxially with said rotary member, a plurality of permanent magnets secured to the rotary member and having pole-pieces of opposite polarity respectively at opposite ends thereof adjacent the periphery of the rotary member and extending in a radial direction, said permanent magnets being so disposed that successive pole-pieces circumferentially of the rotary member are of opposite polarity, a plurality of permanent magnets secured to the rotary inertia member and having pole-pieces of opposite polarity respectively at opposite ends thereof adjacent the periphery of the rotary inertia member and extending in a radial direction, the permanent magnets on said rotary inertia member being so disposed that successive pole-pieces circumferentially of the rotary inertia member are of opposite polarity and being additionally closely arranged with respect to the permanent magnets on said rotary member so that the pole-pieces of opposite polarity on the rotary member and rotary inertia member are normally in axial alignment and move in parallel circular paths whereby the magnetic attraction between the permanent magnets causes the rotary inertia member to rotate with the rotary member as long as the rotary element does not change speed at a rate exceeding a certain rate, the magnetic attraction between the permanent magnets on the rotary member and rotary inertia member being insufficient to prevent the rotation of the rotary inertia member at a speed different from that of the rotary member when the rotary element changes speed at a rate exceeding said certain rate, a winding positioned close to the circular paths through which said permanent magnets move so as to have alternating current voltages induced therein in response to rotation of the rotary member and rotary inertia member respectively, which voltages are respectively equal in effective value and in opposition to each other as long as the rotary inertia member rotates at the same speed as the rotary member and are unbalanced in degree when the two members rotate at different speeds, and means responsive to the current flowing in said winding in response to the unbalanced voltage induced therein.

3. Apparatus for detecting the rate of change of speed of a rotary element, said apparatus comprising a rotary member driven at all times according to the speed of the rotary element, a non-rotative support in coaxial relation to the axis of rotation of the rotary member, a rotary inertia member rotatively mounted on said non-rotative support in spaced axial relation to the rotary member, a plurality of permanent magnets on said rotary member, a plurality of permanent magnets on said rotary inertia member, said permanent magnets having pole-pieces of opposite polarity and being so disposed that successive pole-pieces circumferentially of the rotary member and rotary inertia member are of opposite polarity, the pole-pieces of opposite polarity on the rotary member and rotary inertia member being closely spaced so as to have a magnetic attraction for each other whereby to cause the rotary inertia member to rotate with the rotary member as long as the rotary element does not change speed at a rate exceeding a certain rate and being ineffective to prevent the rotary inertia member from rotating at a speed different from that of the rotary member when the rotary element changes speed at a rate exceeding said certain rate, a winding stationary with respect to said rotary member and rotary inertia member and positioned close to and within the magnetic field of the permanent magnets of the rotary member and the permanent magnets on the rotary inertia member whereby opposing alternating current voltages are induced therein in response to rotation of the rotary member and rotary inertia member respectively, which voltages are substantially equal in effective value and synchronized in frequency as long as the rotary inertia member rotates at the same speed as the rotary member and unequal in effective value and asynchronous in frequency when the rotary inertia member rotates at a speed different from that of the rotary member, and means responsive to the flow of current in the winding occurring as the result of the unequal and asynchronous relation of voltages.

4. Apparatus for detecting the rate of change of speed of a rotary element, said apparatus comprising a rotary member driven at all times according to the speed of the rotary element, a rotary inertia member, permanent magnet means on said rotary member, permanent magnet means on said rotary inertia member, said two permanent magnet means being closely juxtaposed and rotating in adjacent circular paths so as to have magnetic attraction for each other whereby to cause the rotary inertia member to rotate at the same speed as the rotary member as long as the rotary element does not change speed at a rate exceeding a certain rate and ineffective to prevent rotation of the rotary inertia member at a speed different from that of the rotary member when the rotary element changes speed at a rate exceeding said certain rate, a winding disposed radially outwardly with respect to said rotary member and rotary inertia member and so disposed with respect to the permanent magnet means thereon as to be adjacent the circular paths through which they move and thus have alternating current voltages induced therein in response to rotation of the rotary member and rotary inertia member respectively, which voltages are in opposition, substantially equal in effective value and synchronized in frequency as long as the rotary inertia member rotates at the same speed as the rotary member and which are unequal and asynchronous in frequency when the rotary inertia member rotates at a speed different from that of the rotary member, means responsive to the flow of current in said winding in response to the unequal and asynchronous voltages induced therein, and control means for shifting said winding at selected times to different positions radially with respect to said rotary member and rotary inertia member.

5. Apparatus for detecting the rate of change of speed of a rotary element, said apparatus comprising a rotary member driven at all times according to the speed of the rotary element, a rotary inertia member, permanent magnet means on said rotary member, permanent magnet means on said rotary inertia member, said two permanent magnet means having magnetic attraction for each other whereby to cause the rotary inertia member to rotate at the same speed as the rotary member as long as the rotary element does not change speed at a rate exceeding a certain rate and ineffective to prevent rotation of the rotary inertia member at a speed different from that of the rotary member when the rotary element changes speed at a rate exceeding said certain rate, two magnetic core elements nonrotatively mounted radially outwardly with respect to said rotary member and rotary inertia member and magnetically insulated from each other, a winding associated with both of said magnetic core elements so as to be subject to the influence of the magnet flux in both of said cores respectively, one of said magnetic core elements being in radial alignment with the permanent magnet means on the rotary member and the other of said magnetic core elements being in radial alignment with the permanent magnet means on the rotary inertia member whereby variation of the flux density in the magnetic core elements is produced in response to the rotation of the rotary member and rotary inertia member respectively, the permanent magnet means on said rotary member and rotary inertia member being so disposed as to cause variation of flux in the corresponding magnetic core elements in a manner to induce in said winding synchronized alternating voltages substantially equal and opposite as long as the rotary inertia member rotates at the same speed as the rotary member and to induce in said winding unequal and asynchronous alternating voltages when the rotary inertia member rotates at a speed different from that of the rotary member, and means responsive to a predetermined current induced in the winding when the voltages are unequal and asynchronous.

6. Apparatus for detecting the rate of change of speed of a rotary element, said apparatus comprising a rotary member driven at all times according to the speed of the rotary element, a rotary inertia member, permanent magnet means on said rotary member, permanent magnet means on said rotary inertia member, said two permanent magnet means having magnetic attraction for each other whereby to cause the rotary inertia member to rotate at the same speed as the rotary member as long as the rotary element does not change speed at a rate exceeding a certain rate and ineffective to prevent rotation of the rotary inertia member at a speed different from that of the rotary member when the rotary element changes speed at a rate exceeding said certain rate, two magnetic core elements nonrotatively mounted radially outwardly with respect to said rotary member and rotary inertia member and magnetically insulated from each other, a winding associated with both of said magnetic core elements so as to be subject to the influence of the magnetic flux in both of said cores respectively, one of said magnetic core elements being in radial alignment with the permanent magnet means on the rotary member and the other of said magnetic core elements being in radial alignment with the permanent magnet means on the rotary inertia member whereby variation of the flux density in the magnetic core elements is produced in response to the rotation of the rotary member and rotary inertia member respectively, the permanent magnet means on said rotary member and rotary inertia member being so disposed as to cause variation of flux in the corresponding magnetic core elements in a manner to induce in said winding synchronized alternating voltages substantially equal and opposite as long as the rotary inertia member rotates at the same speed as the rotary member and to induce in said winding unequal and asynchronous alternating voltages when the rotary inertia member rotates at a speed different from that of the rotary member, control means for shifting at selected times said magnetic core elements and said winding from an outer position radially inwardly toward the rotary member and rotary inertia member to an inner position, and means responsive to a predetermined current in said winding occurring when the voltages are unequal and asynchronous.

7. Apparatus for detecting the rate of change of speed of a rotary element, said apparatus comprising a rotary member driven at all times according to the rotational speed of the rotary element, a non-rotative support disposed in coaxial alignment with the axis of rotation of the rotary member, a rotary inertia member rotatably mounted on said non-rotative support in spaced axial relation to the rotary member, a permanent magnet means on the rotary member, permanent magnet means on the rotary inertia member, said two permanent magnet means having pole-pieces extending axially toward each other whereby the pole-pieces of opposite polarity are mutually attracted magnetically to cause the rotary inertia member to rotate at the same speed as the rotary member as long as the rotary element does not change speed at a rate exceeding a certain rate, the attraction of the permanent magnets being ineffective to prevent the rotation of the rotary inertia member at a speed different from the rotary member when the rotary element changes speed at a rate exceeding said certain rate, two magnetic core elements magnetically insulated from each other and disposed radially outwardly with respect to the said rotary member and rotary inertia member in such a manner that one magnetic core element is in radial alignment with the permanent magnet means on the rotary member and the other magnetic core element is in radial alignment with the permanent magnet means on the rotary inertia member, a winding associated with both of said magnetic core elements and having voltages respectively induced therein in response to rotation of the rotary member and rotary inertia member which are synchronized in frequency and of substantially equal and opposite instantaneous values as long as the rotary inertia member rotates at the same speed as the rotary member, and which differ in frequency and instantaneous value when the rotary inertia member rotates at a speed different from the rotary member, and means responsive to the flow of current in said winding occurring in response to the differing frequency and instantaneous values of voltages.

8. Apparatus for detecting the rate of change of speed of a rotary element, said apparatus comprising a rotary member driven at all times according to the rotational speed of the rotary element, a non-rotative support disposed in coaxial alignment with the axis of rotation of the rotary member, a rotary inertia member rotatably mounted on said non-rotative support in spaced axial relation to the rotary member, permanent magnet means on the rotary member, permanent magnet means on the rotary inertia member, said two permanent magnet means having pole-pieces extending axially toward each other whereby the pole-pieces of opposite polarity are mutually attracted magnetically to cause the rotary inertia member to rotate at the same speed as the rotary member as long as the rotary element does not change speed at a rate exceeding a certain rate, the attraction of the permanent magnets being ineffective to prevent the rotation of the rotary inertia member at a speed different from the rotary member when the rotary element changes speed at a rate exceeding said certain rate, two magnetic core elements magnetically insulated from each other and disposed radially outwardly with respect to the said rotary member and rotary inertia member in such a manner that one magnetic core element is in radial alignment with the permanent magnet means on the rotary member and the other magnetic core element is in radial alignment with the permanent magnet means on the rotary inertia member, a winding associated with both of said magnetic core elements and having voltages respectively induced therein in response to rotation of the rotary member and rotary inertia member which are synchronized in frequency and of substantially equal and opposite instantaneous values as long as the rotary inertia member rotates at the same speed as the rotary member, and which differ in frequency and instantaneous value when the rotary inertia member rotates at a speed different from the rotary member, means responsive to the flow of current in said winding occurring in response to the differing frequency and instantaneous values of voltages, and fluid pressure responsive means for shifting at selected times said magnetic core elements and said winding from an outer position radially inwardly to an inner position with respect to the permanent magnet means on the rotary member and rotary inertia member.

9. Electric decelerometer apparatus for use in a vehicle brake control system, said apparatus comprising the combination of a rotary member driven at all times according to the rotational speed of a wheel of the vehicle, a rotary inertia member, magnetic means on the rotary member, magnetic means on the rotary inertia member, said two magnetic means being mechanically unconnected but rotatable in adjacent circular paths and having magnetic attraction for each other whereby to cause the rotary inertia member to rotate at the same speed as the rotary member as long as the vehicle wheel does not rotatively decelerate at a rate exceeding a certain rate, and being ineffective to prevent rotation of the rotary inertia member at a speed greater than that of the vehicle wheel when the vehicle wheel rotatively decelerates at a rate exceeding said certain rate, non-rotative electro-magnetic means positioned close to the circular paths of the magnetic means on the rotary member and rotary inertia member in such a manner as to have alternating voltages respectively induced therein in response to rotation of the rotary member and rotary inertia member, said voltages being synchronized in frequency as well as being equal and opposite as long as the rotary inertia member and rotary member rotate at the same speed and being unequal and not synchronized in frequency when the rotary inertia member rotates at a speed higher than that of the rotary member, means responsive to a predetermined current induced in the winding when the voltages are unequal and not synchronzied in frequency, and means for causing said electromagnetic means to have selectively an inner or an outer radial position with respect to said rotary member and rotary inertia member depending upon whether the vehicle brakes are applied or released respectively.

10. Electric decelerometer apparatus for use in a vehicle brake control system of the type having a communication adapted to be charged with fluid at a pressure exceeding a certain value whenever the brakes are applied and in which the pressure is reduced below said certain value when the brakes are released, said apparatus comprising the combination of a rotary member driven at all times according to the rotary speed of a wheel of the vehicle, a rotary inertia member, permanent magnet means on the rotary member, permanent magnet means on the rotary inertia member, said two permanent magnet means having magnetic attraction for each other whereby to cause the rotary inertia member to rotate at the same speed as the rotary member as long as the vehicle wheel does not decelerate at a rate exceeding a certain rate and being ineffective to prevent rotation of the rotary inertia member at a speed greater than the vehicle wheel when the vehicle wheel decelerates at a rate exceeding said certain rate, a winding partly associated with the permanent magnet means on the rotary member and partly associated with the permanent magnet means on the rotary inertia member and having alternating voltages respectively induced therein in response to rotation of the rotary member and rotary inertia member, which voltages are synchronized in frequency as well as equal and opposite as long as the rotary inertia member rotates at the same speed as the rotary member and which are unequal and not synchronized when the rotary inertia member rotates at a speed higher than that of the rotary member, means responsive to the flow of current in said winding resulting from the unequal and non-synchronized voltages induced therein, and fluid pressure responsive means controlled according to the pressure in said communication for shifting said winding radially from an outer position to an inner position with respect to the permanent magnet means on the rotary member and rotary inertia member when the pressure in the communication exceeds said certain pressure and returning it to the outer position when pressure in the communication reduces below said certain pressure.

11. Apparatus for detecting the rate of change of speed of a rotary element, said apparatus comprising a rotary member driven at all times according to the speed of the rotary element, a rotary inertia member, permanent magnet means on said rotary member, permanent magnet means on said rotary inertia member, said two permanet magnet means being unconnected mechanically but moving in adjacent circular paths and cooperating by mutual magnetic attraction to cause said rotary inertia member to rotate at the same speed as the rotary member as long as the rotary element does not change speed at a rate exceeding a certain rate and being ineffective to prevent rotation of the rotary inertia member at a speed different from that of the rotary member when the rotary element changes speed at a rate exceeding said certain rate, a winding disposed adjacent the path of movement of the permanent magnet means on the rotary member and the permanent means on the rotary inertia member and in which alternating voltages are induced upon rotation of said rotary member and rotary inertia member, said voltages being proportional in frequency and effective value to the rotational speed of the rotary member and the rotary inertia member respectively, the voltage induced in the winding by rotation of the rotary member being in opposition to the voltage induced in response to rotation of the rotary inertia member whereby the several voltages induced in the winding are substantially equal and opposite as long as the rotary member and rotary inertia member rotate at the same speed and unbalanced in degree and differing in frequency when the rotary member and rotary inertia member rotate at different speeds, a relay of the direct-current type having a winding, and means including a rectifier for connecting said winding to the winding of said relay whereby to cause pick-up of the relay in response to a predetermined current induced in the said winding.

PHILIP L. CRITTENDEN.